US012812189B2

(12) United States Patent
Maalej

(10) Patent No.: US 12,812,189 B2
(45) Date of Patent: Nov. 24, 2026

(54) METHODS FOR GENERATING ADVERTISEMENT VIDEOS CONSISTENT WITH THE CONTEXT AND STORYLINE OF A PRIMARY VIDEO STREAM

(71) Applicant: Charter Communications Operating, LLC, St. Louis, MO (US)

(72) Inventor: Yassine Maalej, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/581,271

(22) Filed: Feb. 19, 2024

(65) Prior Publication Data

US 2025/0267315 A1 Aug. 21, 2025

(51) Int. Cl.

| | |
|---|---|
| ***H04N 21/234*** | (2011.01) |
| ***H04N 21/2343*** | (2011.01) |
| ***H04N 21/433*** | (2011.01) |
| ***H04N 21/44*** | (2011.01) |
| ***H04N 21/4402*** | (2011.01) |
| ***H04N 21/658*** | (2011.01) |
| ***H04N 21/81*** | (2011.01) |

(52) U.S. Cl.
CPC . *H04N 21/23424* (2013.01); *H04N 21/23418* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 8,799,070 | B1 * | 8/2014 | Sheinfeld | G06Q 30/0242 705/14.72 |
| 10,313,722 | B1 * | 6/2019 | Searl | H04N 21/8456 |
| 11,252,449 | B2 | 2/2022 | Maalej et al. | |
| 2014/0359656 | A1 | 12/2014 | Banica et al. | |
| 2016/0358632 | A1 * | 12/2016 | Lakhani | H04N 9/802 |
| 2018/0204111 | A1 | 7/2018 | Zadeh et al. | |
| 2021/0099746 | A1 * | 4/2021 | Sodagar | H04N 21/26208 |
| 2022/0014804 | A1 * | 1/2022 | Maalej | H04N 21/812 |
| 2024/0355064 | A1 * | 10/2024 | Skrypnyk | G06T 17/20 |
| 2025/0080795 | A1 * | 3/2025 | Nemalipuri | H04N 21/812 |

FOREIGN PATENT DOCUMENTS

WO 2014/200468 A1 12/2014

* cited by examiner

*Primary Examiner* — Brian T Pendleton
*Assistant Examiner* — Jean D Saint Cyr
(74) *Attorney, Agent, or Firm* — The Marbury Law Group, PLLC

(57) ABSTRACT

Embodiments include methods for generating advertisement videos for insertion into a video stream to promote a product, service, or brand in a manner that is consistent with the context and storyline of the video stream before and at the time of ad insertion. Methods may include capturing an image from the video stream and generating caption text using an image-to-text description model. A product, service, or brand that is consistent with the context and storyline of the captured image is selected and ad video sequence description text is generated that includes descriptions and a storyline blending descriptions of the selected product, service, or brand with the context and storyline of the primary video stream. The ad video sequence description text is used to prompt a text-to-video generation model that generates a new advertisement video clip, which is inserted into the primary video stream before distribution to video content rendering devices.

19 Claims, 7 Drawing Sheets

METHODS FOR GENERATING ADVERTISEMENT VIDEOS CONSISTENT WITH THE CONTEXT AND STORYLINE OF A PRIMARY VIDEO STREAM

BACKGROUND

The insertion of advertisements ("ads") in television and other video formats has a long history. Originally, video containing an ad was spliced into the original video information manually. Later, systems were developed to automate the insertion of ads into video streams, such as at indicated insertion points in the video. Pre-recorded ads inserted into video streams have been selected based on the expected viewership of a given video stream. More recently, concepts for selecting a prerecorded ad for insertion into a video stream responsive to a context or storyline in the video stream have been developed. Such ad insertion methods have leveraged pre-recorded ads. Consequently, ads in television and other video streams can be inserted many times that are not necessarily consistent with the storyline in the interrupted video.

SUMMARY

Various aspects include methods and apparatuses for generating an advertisement video for insertion into a primary video stream in which the advertisement video promotes a particular product or brand in a manner that is consistent with the full context and storyline of the primary video stream before and at the time of the ad insertion. Various aspects may include capturing a selected image or images from the primary video stream before an ad splice break, processing the captured images in an image-to-text description module to generate a caption text that describes a context and storyline of the captured selected images of the primary video stream, selecting, from among a plurality of products, services, or brands to be advertised, one product, service, or brand that resembles or is consistent with the context and storyline of the captured images, refining the generated caption text of the context and storyline to include the selected product, service, or brand to generate ad video sequence description text that describes an ad storyline involving the selected product, service, or brand that couples or blends the selected product, service, or brand with context and storyline of the captured images of the primary video stream, applying the ad video sequence description text to a text-to-video generation model to generate a new advertisement video clip, and inserting the generated new advertisement video clip into the primary video stream for distribution to video content rendering devices.

In some aspects, inserting the generated new advertisement video clip into the primary video stream for distribution to video content rendering devices may include inserting the generated new advertisement video clip into the primary video stream in the ad splice break just after capture of the selected image or images from the primary video stream.

Further aspects include a computing device including a memory and a processing system having at least one processor configured to perform operations of any of the methods summarized above. Further aspects include a non-transitory processor-readable storage medium having stored thereon processor-executable software instructions configured to cause a processor to perform operations of any of the methods summarized above. Further aspects include a computing device having means for performing functions of any of the methods summarized above.

BRIEF DESCRIPTION OF THE DRAWINGS

The accompanying drawings, which are incorporated herein and constitute part of this specification, illustrate example embodiments of various embodiments, and together with the general description given above and the detailed description given below, serve to explain the features of the claims.

DETAILED DESCRIPTION

Figure 1A:
FIG. 1A is an image from a video stream showing an example scene and contained objects before an ad break.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and computing devices or systems implementing such methods for generating an advertisement video for insertion into a primary video stream in which the advertisement video promotes a particular product, service, and/or brand in a manner that is consistent with the full context and storyline of the primary video stream before and at the time of the ad insertion. Various embodiments may include capturing selected images from a primary video stream and using an image-to-text description model to generate a textual description of the primary video stream context, referred to herein as a caption text. Various embodiments may include selecting, from among a plurality of products or brands to be advertised, a product or brand that resembles or is consistent with the context and storyline of the captured images. A large language model (LLM) may be used to generate an ad video content description text that adds descriptions of the selected product or brand into the caption text of the primary video stream. The generated ad video content description text may be applied to a text-to-video generation model to generate a new advertisement video clip, which is inserted into the primary video stream for distribution to video content rendering devices (e.g., televisions, smartphone, computers, etc.).

The term "computing device" is used herein to refer to stationary computing devices including personal computers, desktop computers, all-in-one computers, workstations, super computers, general purpose GPUs, mainframe computers, embedded computers (such as in vehicles and other larger systems), computing systems within or configured for use in vehicles, servers, multimedia computers, and game consoles. The terms "computing device" and "mobile computing device" are used interchangeably herein to refer to any one or all of cellular telephones, smartphones, personal or mobile multi-media players, personal data assistants (PDA's), laptop computers, tablet computers, convertible laptops/tablets (2-in-1 computers), smartbooks, ultrabooks, netbooks, palm-top computers, wireless electronic mail receivers, multimedia Internet enabled cellular telephones, mobile gaming consoles, wireless gaming controllers, and similar personal electronic devices that include a memory, and a programmable processor.

Various embodiments are described in terms of processor-executable instructions, for ease and clarity of explanation, but may be similarly applicable to any data, e.g., text, prompts, program data, or other information stored in memory. The terms "prompts", "text", "data", "sequence, "tokens", and "information" are used interchangeably herein and are not intended to limit the scope of the claims and descriptions to the types of instructions or information used as examples in describing various embodiments.

Various embodiments are described with reference to artificial intelligence (AI) models and modules. The term "AI model" is used herein to refer generally to any of a variety of computer models that have been trained on a dataset of images, text, or combinations of text and images to receive a prompt in various forms and output a response or inference consisting with the training dataset. Many AI models include or make use of neural network architectures, which include a large number of layers of processing nodes that receive input values, perform computations based on the input values and weights, and propagate the result (referred to as "activations") to the next layer. AI models "learn" by adjusting weights and biases that affect the activations from node to node across layers. To produce an output in response to an input ("prompt"), an AI model performs hundreds of matrix multiplications like this formula across all of the layers to yield a final calculation, which can be transformed into words or images. Consequently, the information learned by an AI model is encoded in matrices of weights and biases, and not in code, databases or tables algorithm-based processing methods. However, conventionally programmed computing devices (i.e., algorithm-based programming) can use AI models as part of their processing by prompting an AI model (e.g., via an application programming interface (API)).

As other methods for inserting ads into video streams (e.g., television shows and live programs) use prerecorded ads, the resulting video programs often feature repetitive ads that often are inconsistent in terms of context and content with the video steam in which the ad is inserted. This can be annoying to viewers and reduce the impact of ads.

Various embodiments disclosed herein overcome these problems with video advertising by generating new advertisement ("ad") videos for insertion into a primary video stream in which the advertisement video is generated to promote a particular product, service and/or brand in a manner that is consistent with the context and storyline of the primary video stream before and at the time of the ad insertion. These operations are accomplished by a computing device or computing system that includes or makes use of various generative artificial intelligence (AI models, which may include an image-to-text generative AI model, a large language model (LLM), a text-to-image generative AI model, and/or a text-to-video generative AI model.

In various embodiments, active video content may be received by the computing device or system and segmented into scenes and specific image frames extracted. In particular, the image frames extracted by the computing device or system may be images selected from a scene in which the same viewing perspective, content and context are presented (i.e., a longer than average "shot"). Such a long scene may be more representative of the storyline than brief shots or clips in the video stream.

The extracted image frame or frames may be processed by an image-to-text generative AI model to output a textual representation of the context and storyline of the video at the time of capture text. This textual representation of the context and storyline of the video is referred to herein as a "caption text." The image-to-text generative AI model is a powerful tool for processing capturing selected images from the primary video stream to generate caption text that describes the context and storyline of those images. This technology leverages a deep learning AI model trained on a large dataset of images to recognize context, objects and storylines in images, and leverage the power of large language models to understand the implications or meanings of individuals, objects, and actions within the images. These capabilities enable the model to generate a caption text that captures the context and essence of the visual content from the primary video stream.

In some embodiments, the image-to-text generative AI model may be a transformer-based model that is trained on a large text corpora and utilizes a tokenizer to infer the context and extract pertinent features (e.g., recognized objects, sounds, speech, etc.) of a video sequence. By training such a model on a diverse set of images, the computing device or system may learn to recognize contextual cues such as scene changes, character interactions, and other elements that contribute to the overall narrative of a video.

As with typical television, the owner of the media distribution network may generate revenue by selling ads for a plurality of different products, services, and brands, with the ads inserted into video streams at insertion points. In various embodiments, the context, content and/or storyline of the capture video images are used by the computing device or system to select from the plurality of different products, services, and brands, one or a few that are compatible with or consistent with the video stream before and at the time of the ad insertion. The caption text output by the video-to-text generative AI model may serve as a sort of "script" for the video, providing contextual information about what is happening on screen, as well as identifying objects in the scene, that the computing device or system may use to select the compatible/consistent product, service, or brand to advertise in the next ad insertion place.

The computing device or system leverage an LLM to process the caption text to understand the context of the video based on described elements in the images, such as characters, objects, and actions that are relevant to the story being told in the video. Using the generated textual representation of the context, content and storyline of the captured video images, the computing device or system may select a product, service, or brand that is most consistent with or particularly relevant to the context, content and storyline of the capture video images. In some embodiments, the computing device or system may use an LLM to understand similarities in context between the captioned text and product, service, or brand description that will be included in the original context of the scene. In some embodiments, the computing device or system may use multi-dimensional vector analysis to identify the product, service, or brand that is most relevant to the caption text, and which will not change the main storyline based on measured similarity tensors.

With the product, service, or brand to be advertised selected, the computing system may prompt a generative AI language model (e.g., an LLM) to create an ad video sequence description text for an ad video that incorporates both the original caption and features and context of the selected product, service, or brand. In response to the prompt, the LLM may incorporate brand names, descriptions of the product, standard text for audio to be included in an ad for the product or brand, and other product information into the generated ad video sequence description text that is consistent or compatible with the overall storyline of the video stream before and at the time of the ad insertion. By generating ad video sequence description text for a product, service, or brand that is consistent with the context and storyline of the captured images, the computing device or system may generate a new (i.e., not pre-recorded) ad that couples the selected product, service, or brand with the visual content of the viewed video in a way that feels natural and organic to viewers. The process of generating the ad video sequence description text may include selecting and reducing the dimension of embedding tensors for the input, and computing a similarity matrix between the list of embeddings.

The computing device or system may then input the generated ad video sequence description text into a text-to-video generative AI model that is trained to generate new advertisement video clip frames based on text inputs. The output of the text-to-video generative AI model is a new generated ad video clip that is created and stored just before the ad insertion point (referred to as an ad spice break) in the video stream occurs. Some embodiments may use spatio-temporal dependent structures optimization methods to reduce noise in the generated new ad video clip frames, ensuring that the resulting video is smooth and coherent. By optimizing the alignment between adjacent frames in the new ad video clip based on their spatial and temporal relationships, the computing device or system can create a video that presents a seamless and engaging ad experience for viewers while effectively promoting the selected product, service, or brand.

Finally, the generated new ad video clip may be inserted into the video stream at an advertisement insertion point, and the combined video stream delivered to video display equipment (e.g., televisions, smart devices, computers, etc.) for viewing by subscribers to the video delivery service.

Figure 1B:
FIG. 1B is an example image from a generated ad video clip advertising a selected product that is consistent with the scene and contained objects in the video stream shown in FIG. 1A.

FIG. 1A shows an example of a captured video image and FIG. 1B shows an example of a frame of a generated new ad video clip generated by a computing device or system implementing various embodiments. In a video program in which three friends meet at a restaurant for drinks and food, an extended duration sequence (i.e., a longer than average duration "shot") may show the three friend talking as a waiter delivers food to the table, as shown in FIG. 1A. As illustrated, an image captured from this sequence shows people sitting around a table with drinks and food on the table. A trained AI image-to-text translation model processing the capture video image may recognize the context of captured image to be people eating together in a restaurant, recognize the context as including drinks and food on the table, and recognize the storyline as three people eating together. These details may be reflected in a textual format of the context and storyline that is output by the image-to-text translation model.

The operations of various embodiments described herein may use the context, content and storyline text output by the image-to-text translation model, to select a particular product, service, or brand to advertise that is consistent with one or more of the context, content and storyline. A generative AI model, such as an LLM, may then be used to generate a textual description of video context and content that incorporates the product, service, or brand to be advertised into the storyline of the captured video image. This ad video sequence description text is processed in a text-to-video generative AI model to output a new ad video clip as illustrated in FIG. 1B. As that image shows, the new ad video clip features the advertised product, e.g., a beverage, on a table in a restaurant as three people enjoy a meal together. Thus, the generated ad has a scene with a storyline that is consistent with the video stream into which the ad will be inserted.

Figure 2:
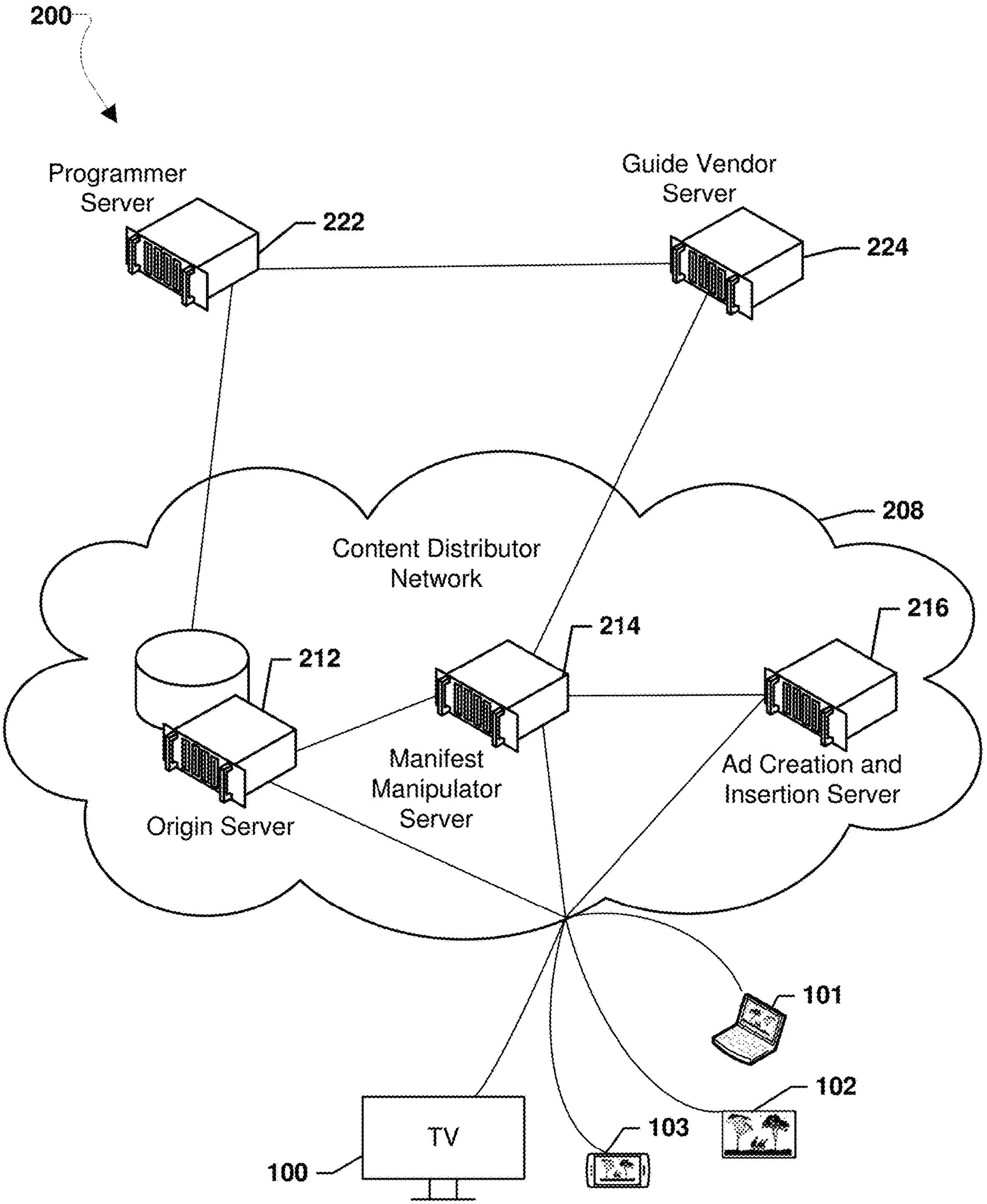
FIG. 2 is a component block diagram illustrating an example content distribution system suitable for implementing various embodiments.

FIG. 2 illustrates components of a video delivery system 200 suitable for implementing various embodiments. With reference to FIGS. 1A-2, the IP network 200 may include a content distributor network 208 coupled to remote video content rendering devices (i.e., 210). An IP network 200 may include one or more of an origin server 212, a manifest manipulator server 214, ad creation and insertion server 216, a programmer server 222, and/or guide vendor server 224. The content distributor network 208 may be configured to deliver streaming video content to a variety of video content rendering devices, such as televisions 100, computers 101, tablet devices 102, and smartphones 103.

The programmer servers 222, guide vendor servers 224, content distributor networks 208, and video content rendering devices 100, 101, 102, 103 may be connected via one or more wired and/or wireless connections, such as connections to wired and/or wireless networks (e.g., connections to the Internet), and via those connections may exchange data with one another. Via their connections (wired and/or wireless) with one another, the origin server 212, the manifest manipulator server 214, and the ad creation and insertion server 216 may exchange data, including video content data, with one another. In various embodiments, the content distributor network 208 may be operated by a content distributor (e.g., Charter®, Comcast®, DirecTV®, Sling® TV etc.) and may provide video streaming services via IP streaming (e.g., ABR streaming, such as Apple HLS, DASH, etc., or any other type IP streaming) to a variety of video content rendering devices 100, 101, 102, 103.

In various embodiments, the programmer server 222 may be a server of a programmer (e.g., Turner Broadcasting®, ESPN®, Disney®, Viacom®, etc.) that provides content for viewing by consumers via the content distributor network 208. For example, the programmer server 222 may provide programmer content (i.e., video content) to the origin server 212. An encoder and packager at the programmer server 222 or origin server 212 may format the programmer content and the origin server 212 may store the programmer content (i.e., content) for streaming. The programmer server 222 may also be configured to determine alternate content for the content in a programming schedule and generate a programmer alternate content mapping table for the program schedule indicating the determined programmer alternate content. The programmer server 222 may send the program schedule and the programmer alternate content mapping table to the guide vendor server 224.

While the origin server 212 is illustrated in FIG. 2 as part of the content distributor network 208, the origin server 212 may be a server of a separate content delivery network (CDN) service, such as Akamai®, Amazon®, Netflix®, Hulu®, Vudu®, HBOGo®, etc., to which the content distributor network 208 operator or programmer offloads content storage and delivery.

The guide vendor server 224 may be configured to receive content schedules and programmer alternate content mapping tables from various programmers and generate a program guide, indicating programmer alternate content availability, or content recommendations. The guide vendor server 224 may be a server operated by a guide vendor (e.g., Gracenote®, Rovi®, etc.). The guide vendor server 224 may send the program guide indicating programmer alternate content availability or the content recommendations to the content distributor network 208, such as to the manifest manipulator server 214. In various embodiments, the content distributor network 208 or the manifest manipulator server 214 may provide the program guide indicating programmer alternate content availability or the content recommendations to the consumer computing devices 100, 101, 102, 103. Alternatively, the program guide indicating programmer alternate content availability, or the content recommendations may be provided from the guide vendor server 224 to the consumer computing devices 100, 101, 102, 103.

The manifest manipulator server 214 may be configured to generate or manipulate manifest files, such as a .mpd type files for DASH, .m3u8 type files for Apple HLS, etc., that describe the programmer content provided by the programmer server 222 and stored at the origin server 212. The manifest files may be stored at the origin server 212 and may define the segments of content provided by a programmer server 222 as well as segments for advertisements to be displayed according to an ad plan for a given content or channel. Manifest files may be pre-generated by the manifest manipulator server 214 based on the program guide from the guide vendor server 224. In various embodiments, the manifest manipulator server 214 may be configured to modify the pre-generated manifest files to generate manifest files for programmer alternate content or the content recommendations. The manifest manipulator server 214 may provide manifest files to requesting ones of the Consumer content rendering devices 100, 101, 102, 103. The content rendering devices 100, 101, 102, 103 may use the manifest files or the content recommendations to retrieve and play content, including programmer alternate content or the content recommendations.

The ad creation and insertion server 216 may receive video content in various streaming formats and perform operations as described herein to generate ads for products or brands that match or are consistent with the context, content and/or storyline of a video stream before delivery to content rendering devices 100, 101, 102, 103. The ad creation and insertion server 216 may include as part of its programming or integrated processors and/or access (e.g., an application programming interface (API)) one or more trained AI models, including image-to-text generative AI model, a large language model (LLM), and a text-to-video generative AI model as described herein.

Figure 3:
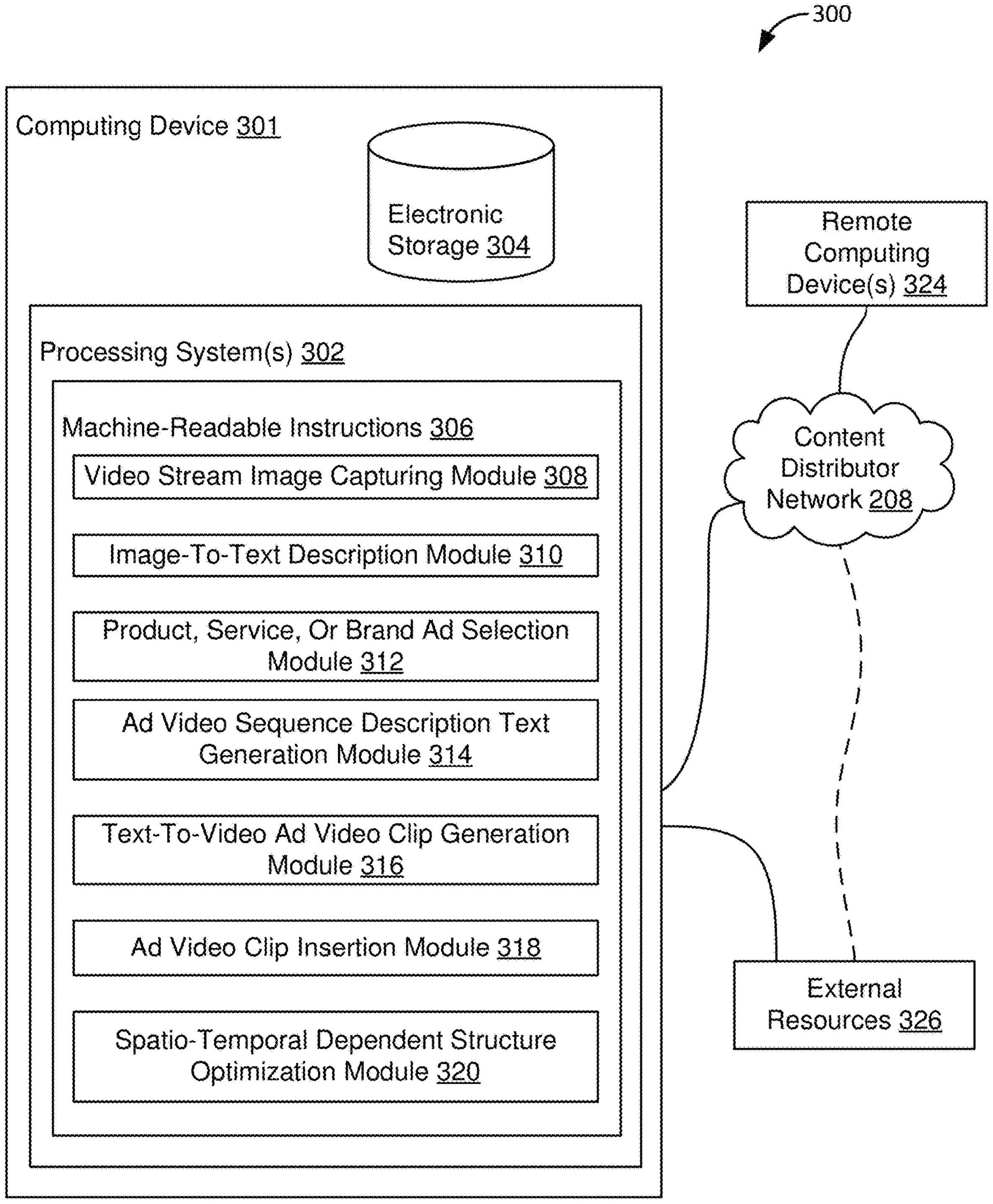
FIG. 3 is component and software module block diagram illustrating a communication system and computing device suitable for implementing various embodiments.

FIG. 3 are component block diagrams illustrating a communication system 300 including a computing device 301 (e.g., ad creation and insertion server 216) configured for performing methods for generating an advertisement video for insertion into a primary video stream in which the advertisement video promotes a particular product or brand in a manner that is consistent with the full context and storyline of the primary video stream before and at the time of the ad insertion accordance with various embodiments. With reference to FIGS. 1A-3, a computing device 301 may include one or more processing systems 302 coupled to electronic storage 304 and be configured with machine-readable instructions modules to receive video stream data from or within a content distribution network 208 and return video stream data with a generated product or brand ad inserted to the content distribution network 208. In the communication system 200, the content distribution network 208 may receive video content from a remote computing devices 222 (e.g., a server or virtual (VM) or cloud). Additionally, the computing device 301 may be configured to access external resources 326 via a network (e.g., the Internet), such as but not limited to large language model (LLM) models or services, generative AI video models or services, and advertisement image and information databases.

The processing system(s) 302 may be configured by machine-readable instructions 306. Machine-readable instructions 306 may include one or more instruction modules. The instruction modules may include computer program modules. In some embodiments, the functions of the instruction modules may be implemented in software, firmware, hardware (e.g., circuitry), or a combination of software and hardware, which are configured to perform particular operations or functions. The instruction modules may include one or more of a video stream image capturing module 308, an image-to-text description module 310, a product, service, or brand ad selection module 312, an ad video sequence description text generation module 314, a text-to-video ad video clip generation module 316, an ad video clip insertion module 318, a spatio-temporal dependent structure optimization module 320, or other instruction modules.

The video stream image capturing module 308 may be configured to capturing selected images from the primary video stream. For example, the video stream image capturing module 308 may segment the video content into portions or scenes based on changes in scene, image content, and other breaks detectable in a video stream. In some embodiments, the video stream image capturing module 308 may monitor the primary video stream or segments to recognize durations of scenes or segments, and extract an image within a scene that lasts longer than a threshold duration. Longer duration scenes or video segments may be more representative of the storyline of the video compared to short sequences or shots. Additionally, the video stream image capturing module 308 may monitor indications in the video stream that indicate in advance when an ad insertion point (i.e., ad splice break) will be occurring and begin monitoring the primary video stream to select and capture one or more images. The video stream image capturing module 308 may store or buffer the captured image data for processing by the image-to-text description module 310 to generate caption text describing the context and storyline of the primary video stream.

The image-to-text description module 310 may be configured to generate a caption text that describes a context and storyline of the captured selected images of the primary video stream. For example, the image-to-text description module 310 may include or access an AI model that has been trained on a diverse set of images to recognize contextual cues such as scene changes, character interactions, and other elements that contribute to the overall narrative of a video. In some embodiments, the image-to-text description module 310 may also be configured to combine the textual representation of the context, content and storyline of the video image position data, such as by adding positional encoded embeddings to token embeddings of the combined image description text. The output of the image-to-text description module 310 may be a caption text that provides contextual information about what is happening on screen, which the ad selection module 312 may save or buffer in memory for use in selecting the product, service, or brand to be advertised.

The product, service, or brand ad selection module 312 may be configured to selecting, from among a plurality of products, services, or brands to be advertised, one product or brand that resembles or is consistent with the context and storyline of the captured images. For example, the product, service, or brand ad selection module 312 may use or access an LLM to select the most relevant product, service, or brand for inclusion in the ad based on the tokens in the caption text and text in memory that describes each of the products, services, and brands for advertising. In some embodiments, the product, service, or brand ad selection module 312 may also be configured to provide descriptive information regarding the selected product, service, or brand to the ad video sequence description text generation module 314.

The ad video sequence description text generation module 314 may be configured to refining the generated caption text of the context and storyline to include the selected product, service, or brand to generate an ad video sequence description text, which is a new caption text that describes a context and storyline involving the selected product, service, or brand that couples or blends the selected product, service, or brand with the context and storyline of the captured images of the primary video stream. For example, the ad video sequence description text generation module 314 may use an LLM that is prompted to rewrite the caption text to integrate descriptions of the selected product, service, or brand into the context and storyline of the captured images, thereby generating an ad video sequence description of an advertisement that is consistent with the context and storyline of the primary video stream before and at the time of the ad insertion. In some embodiments, the ad video sequence description text generation module 314 may provide or store/buffer the ad video sequence description text for processing by the text-to-video ad video clip generation module 316.

The text-to-video ad video clip generation module 316 may be configured to applying the ad video sequence description text to a text-to-video generative AI model to generate a new advertisement video clip. For example, the ad video sequence description text may be included in a prompt that is input to a video generative AI model (e.g., 418) that is trained to generate photorealistic images based on the description in the text, with each image varying to render movement of objects in the scene to create a video clip as described in the ad video sequence description text. Additionally, the video generative AI model may generate sounds, including speech associated with characters in the video clip as articulated in the ad video sequence description text.

In some embodiments, the text-to-video ad video clip generation module 316 may be a diffusion probabilistic model that uses a fast ordinary differential equation (ODE) solver to determine the most likely objects that should be included in the generated ad video clip frames, considering the tokens in the text refined by the text refinement module. A diffusion probabilistic model is a generative framework that synthesizes data by progressively denoising an initial random noise distribution. This denoising process is orchestrated through a Markov chain, consisting of a sequence of steps, each step conditioned on the previous one. At each step, the model applies a slight denoising transformation, effectively guiding the noise towards a structured and coherent data sample that resembles the intended target distribution. A diffusion probabilistic model is particularly suitable for applications requiring high-fidelity and detailed data synthesis, such as text-to-video AI generative models. Using such a model may ensure that the generated ad video clip remains relevant and contextually accurate, even as it incorporates the selected product or brand into the storyline of the primary video stream. The text-to-video ad video clip generation module 316 may store or buffer the generated ad video clip in memory for use by the ad video clip insertion module 318 when it is time to insert the ad into the primary video stream.

The ad video clip insertion module 318 may be configured to inserting the generated new advertisement video clip into the primary video stream for distribution to video content rendering devices. For example, the ad video clip insertion module 318 may substitute the generated ad video clip into the video stream, thus replacing the primary video stream frames during the period of ad insertion. In some embodiments, the ad video clip insertion module 318 may be configured to insert the generated new ad video clip into the primary video stream in the ad splice break that occurs just after capture of the selected image or images performed by the video stream image capturing module 308. In some embodiments, the ad video clip insertion module 318 may also format the combined video stream for distribution by other elements of a content distribution network.

The spatio-temporal dependent structure optimization module 320 may be configured to optimizing the spatio-temporal dependent structures of the generated new advertisement video clip frames to reduce noise of the video creation process before the ad video clip is provided to the ad video clip insertion module 318. The optimization of spatio-temporal dependent structures between the frames of the generated ad video clip further enhances the accuracy of image frames, reducing noise during the video creation process and aligning the visual information presented to viewers with the coherence and alignment of adjacent frames. In some embodiments, the spatio-temporal dependent structure optimization module 320 may receive the generated ad video clip from the text-to-video ad video clip generation module 316 and store or buffer the refined ad video clip in memory for use by the ad video clip insertion module 318 when it is time to insert the ad into the primary video stream.

The electronic storage 304 may include non-transitory storage media that electronically stores information. The electronic storage media of electronic storage 304 may include one or both of system storage that is provided integrally (i.e., substantially non-removable) with the computing device 301 and/or removable storage that is removably connectable to the computing device 301 via, for example, a port (e.g., a universal serial bus (USB) port, a firewire port, etc.) or a drive (e.g., a disk drive, etc.). Electronic storage 304 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 304 may include one or more virtual storage resources (e.g., cloud storage, a virtual private network, and/or other virtual storage resources). Electronic storage 304 may store software algorithms, information determined by processing system(s) 302, information received from the computing device 301, or other information that enables the computing device 301 to function as described herein.

The processing system(s) 302 may be configured to provide information processing capabilities in the computing device 301. As such, the processing system(s) 302 may include one or more of a digital processor, an analog processor, a digital circuit designed to process information, an analog circuit designed to process information, a state machine, and/or other mechanisms for electronically processing information. Although the processing system(s) 302 are illustrated as single entities, this is for illustrative purposes only. In some embodiments, the processing system(s) 302 may include a plurality of processing units and/or processor cores. The processing units may be physically located within the same device, or processing system(s) 302 may represent processing functionality of a plurality of devices operating in coordination. The processing system(s) 302 may be configured to execute modules 308-314 and/or other modules by software; hardware; firmware; some combination of software, hardware, and/or firmware; and/or other mechanisms for configuring processing capabilities on the processing system(s) 302. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 308-314 is for illustrative purposes, and is not intended to be limiting, as any of modules 308-314 may provide more or less functionality than is described. For example, one or more of the modules 308-314 may be eliminated, and some or all of its functionality may be provided by other modules 308-314. As another example, the processing system(s) 302 may be configured to execute one or more additional modules that may perform some or all of the functionality of the modules 308-314.

Figure 4:
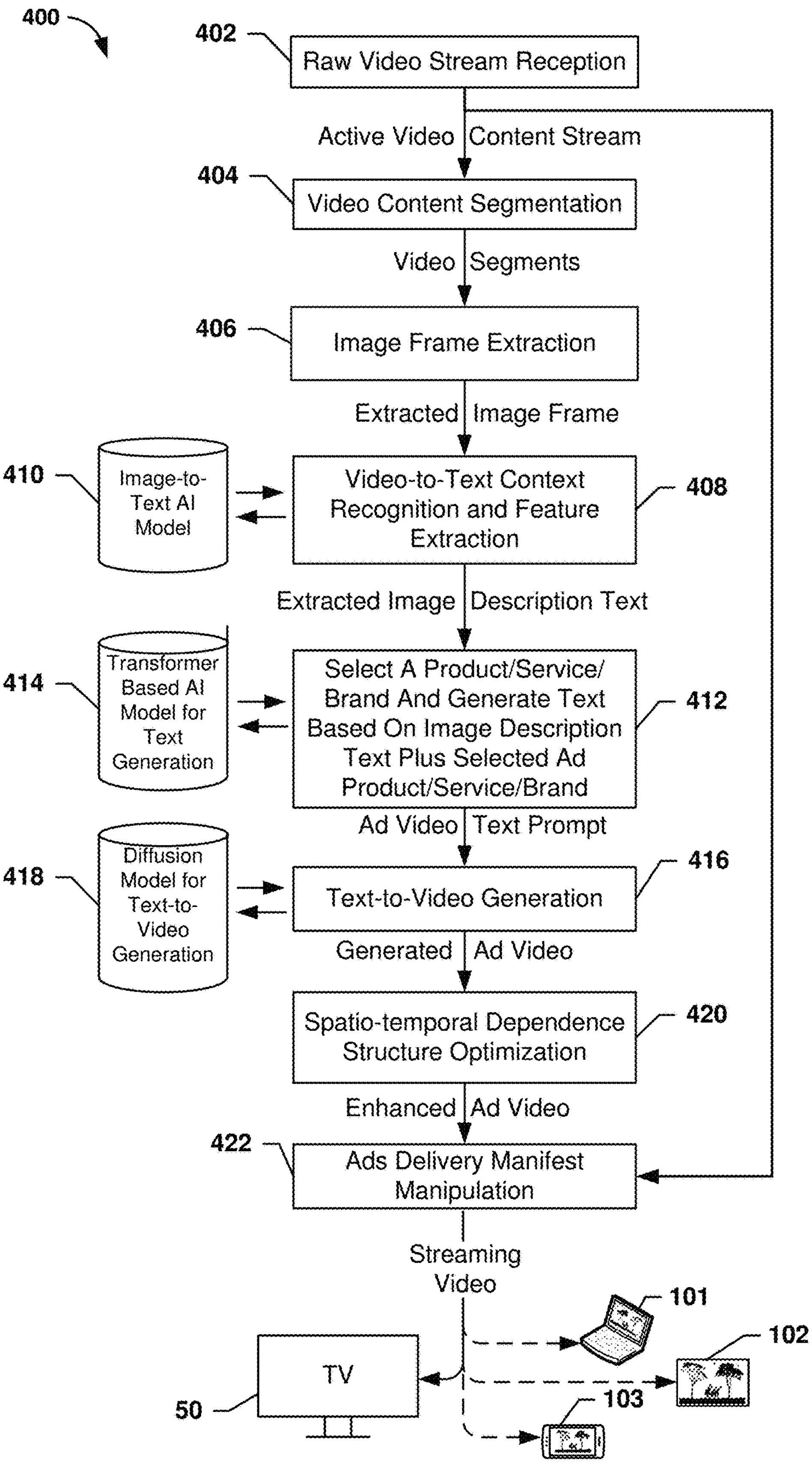
FIG. 4 is a processing flow drawing illustrating operations and modules for implementing various embodiments.

FIG. 4 illustrates operations and interim outputs that may be involved in generating contextually relevant advertisement video content by processing and transforming raw video streams.

In block 402, the computing device or system receives a raw or primary video stream from a video content provider. For example, the computing device or system may receive a prerecorded video stream from a video content server, receive a live or video on demand (VOD) streaming feed from a television network (e.g., a sports broadcast program), or receive a program feed from a cable network or content provider.

In block 404 the computing device or system may segment the received video content stream into discrete video segments, such as in response to scene changes in the video stream and/or based on segment indications in the media data. Segmenting the video stream into portions may enable a granular analysis of the video for selecting images for further processing. The result of the segmentation may be a sequence of video segments.

In block 406 the computing device or system may extract one or a few image frames from the video segments, resulting in one or a collection of extracted image frames for further analysis. As described above, the process of selecting and extracting one or more image frames may include recognizing and selecting/extracting a video segment that is longer than average or longer than a threshold duration or number of frames.

In block 408 the computing device or system may process the extracted one or more image frames through an image-to-text generative AU model 410 that is trained to recognize context and features in images and translate the visual content into descriptive text. As described, the output of this processing may be extracted image text in the form of a caption text that is sort of a "script" of the video in the segment from which the analyzed image or images were extracted.

In block 412 the computing device or system may use a transformer based AI model 414 for text generation (e.g., an LLM) to perform operations of selecting a product, service, or brand to advertise from a plurality of products, services, and brands based on the caption text, and then generate the ad video sequence description text based on the caption text and the information regarding the selected ad product, service, or brand (e.g., descriptions, ad text, advertiser product placement instructions, etc.). In some embodiments the operations in block 412 may be accomplished in two operations (e.g., two prompts to the transformer based AI model 414), such as one or more prompts to select the consistent/compatible product, service, or brand to advertise followed by one or more prompts for generation of the ad video sequence description text. An output of this processing may be an ad video sequence text prompt for input to a text-to-video generative AI module.

In block 416 the computing device or system may input the ad sequence text prompt to a text-to-video generative AI model 418 that is trained to output a video clip based on descriptions in the input text. These operations may use ad video sequence text prompt generate a series of ad video frames that reflect or encompass the essence of the original video content along with the ad product/brand plus advertising narrative.

In block 420 the computing device or system may perform spatio-temporal dependence structure optimization to improve the generated ad video clip before insertion into the video stream. The operations of spatio-temporal dependence structure optimization may improve the spatio-temporal aspects of the video frames by reducing noise and enhancing the overall ad video quality.

Finally, in block 422 the computing device or system may perform the manifest manipulation with ad video URL to delivery, and perform Ads Delivery Manifest Manipulation to insert the generated ad video clip into the primary video stream at an ad insertion splice break, and stream the combined video content for delivery and display on various rendering devices, such as televisions 100, computers 101, tablet devices 102, and smartphones 103. In some embodiments, the generated new ad video clip may be inserted into the primary video stream in the ad splice break that occurs just after extraction of the selected image or images from the primary video stream that was performed in block 406.

Figure 5A:
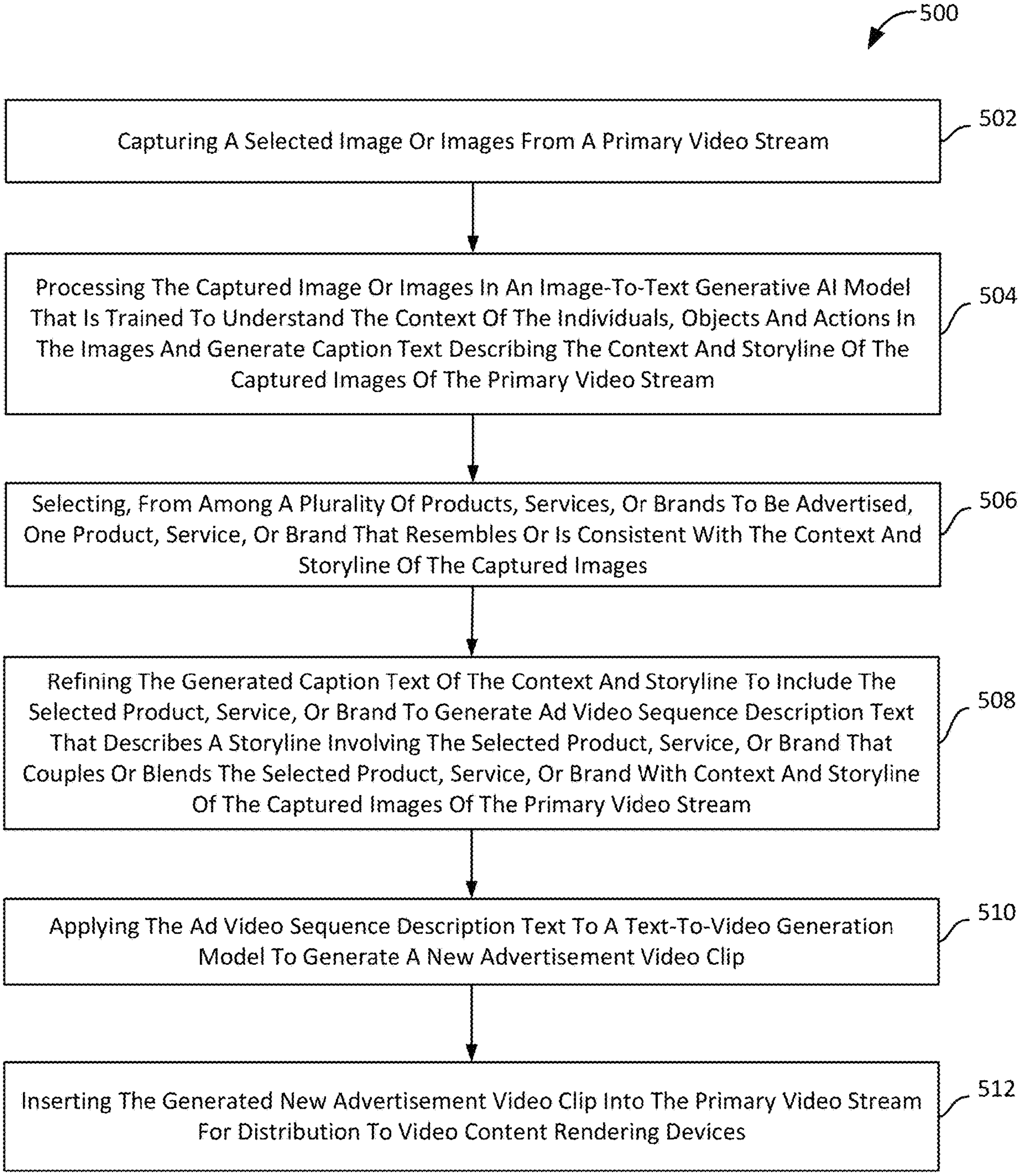
FIGS. 5A and 5B are process flow diagrams illustrating example methods for generating an advertisement video for insertion into a primary video stream according to some embodiments.
Figure 5B:
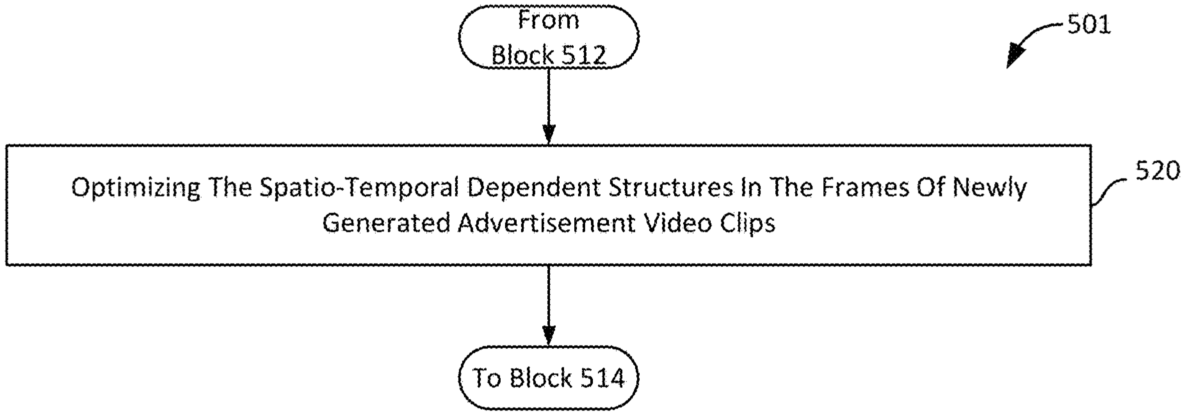

FIGS. 5A and 5B illustrates example methods for implementing a method for generating an advertisement video for insertion into a primary video stream in which the advertisement video promotes a particular product or brand in a manner that is consistent with the full context and storyline of the primary video stream before and at the time of the ad insertion (i.e., the ad splice break) according to some embodiments. With reference to FIGS. 1A-5B, the methods 500 and 501 may be implemented in a processing system of a computing device (e.g., computing device 10), in hardware (e.g., processing system 302), in software executing in a processor (e.g., processing system 302), in an AI model, or in a combination of a software-configured processor coupled to or implementing an AI model and dedicated hardware that includes other individual components. Means for performing functions of the methods 500 and 501 may include a processor (e.g., processing system 302) coupled to memory (e.g., 304), as well as processing systems configured with trained AI models. To encompass the alternative configurations enabled in various embodiments, the hardware implementing the methods 500 and 501 is referred to herein as a "processing system."

In block 502, the processor may perform operations including capturing a selected image or images from the primary video stream. As part of capturing selected images in the primary video stream, the processor may receive a primary video stream and segment the video stream into video segments or portions. In some embodiments, the processor may perform operations including monitoring the primary video stream to recognize scene durations, and extracting an image within a scene that lasts longer than a threshold duration. In some embodiments, monitoring the primary video stream to recognize scenes that last longer than the threshold duration may begin in response to detecting or receiving an indication in the primary video stream, such as a SCTE35/SCTE104 ads markers events included in the primary video stream indicating that an advertisement insertion splice break is upcoming.

In block 504, the processor may perform operations including processing the captured image or images in an image-to-text generative AI model that is trained to understand the context of the individuals, objects and actions in the images and generate a caption text describing the context and storyline of the captured images of the primary video stream. An image-to-text generative AI model may include a generative AI model that has been trained on a dataset of images from video streams to recognize objects and understand audio (particularly speech), and from those details the model recognizes the context and storyline of the portion of the primary video stream from which the image or images were captured. An image-to-text generative AI model may include an LLM that is pre-trained, and may be prompted to translate the recognized context, objects and storyline into descriptive text, which is used as the caption text output.

In block 506, the processor may perform operations including selecting, from among a plurality of products, services, or brands to be advertised, one product, service, or brand that resembles or is consistent with the context and storyline of the captured images. As described, this operation may involve identifying a product, service, or brand for which the description text is most similar to (e.g., closest in a multi-dimension vector space) the caption text describing the primary video stream.

In block 508, the processor may perform operations including generating an ad video sequence description text by refining the generated caption text of the context and storyline to include the selected product, service, or brand in a storyline involving the selected product, service, or brand that couples or blends the selected product or brand with context and storyline of the captured images of the primary video stream. In some embodiments, this operation may be performed using an LLM to generate the ad video sequence description text in response to a prompt that includes the caption text and descriptions of the selected product, service, or brand to be advertised. As part of the operations in block 510, the processor may temporarily store or buffer the generated ad video sequence description text in memory.

In block 510, the processor may perform operations including applying the ad video sequence description text to a text-to-video generation model to generate a new advertisement video clip. For example, processor may include the ad video sequence description text in a prompt that is input to a video generative AI model (e.g., 418) that is trained to generate photorealistic images based on the description in the text, with each image varying consistent with movement of characters to create a video clip consistent with the storyline in the ad video sequence description text. Additionally, the video generative AI model may generate sounds, including speech associated with characters in the video clip as articulated in the ad video sequence description text. As part of the operations in block 510, the processor may temporarily store or buffer the generated ad video clip in memory.

In some embodiments, the text-to-video generation model used in block 510 may be a diffusion probabilistic model that uses a fast ODE to determine the most likely objects that should be included in the generated video clip frames, taking into account tokens in the text refined by the text refinement module. As described above, a diffusion probabilistic model is a generative framework that synthesizes data by progressively denoising an initial random noise distribution. A diffusion probabilistic model leverages the properties of the underlying diffusion process to ensure a controlled and interpretable generation pathway. Using a diffusion probabilistic model in block 510 may enable the generation of images and video frames by meticulously steering the noise through a predefined sequence of denoising stages, each refining the sample's features and structure, culminating in a high-quality and contextually coherent output.

In block 512, the processor may perform operations including inserting the generated new advertisement video clip into the primary video stream for distribution to video content rendering devices. In some embodiments, the operations in block 512 may include formatting the combined video stream for a CDN before distribution to rendering devices, such as via a cable television network, the Internet, a wireless wide-area network, and the like. In some embodiments, the generated new advertisement video clip may be inserted into the primary video stream in the ad splice break that occurs just after capture of the selected image or images from the primary video stream, such as in the ad splice break the indication for which was detected received in the operations of block 502. This may ensure that the context and storyline of the generated ad is consistent with the video stream context and storyline just prior to presentation of the ad.

Referring to FIG. 5B, some embodiments may include further processing of the generated new ad video clip to improve quality before rendering. In some embodiments following the operations in block 512, the processor may perform operations optimizing the spatio-temporal dependent structures in the frames of newly generated advertisement video clips in block 520, before the resulting ad video clip is inserted into the video stream in block 514 as described. The operations in block 520 may significantly reduce the noise and artifacts commonly associated with the frames generation and video stitching process. The spatio-temporal dependent structures optimization method used in block 520 reduces noise in the generated new advertisement video clip frames by optimizing the alignment and coherence between adjacent frames based on their spatial and temporal relationships. This method involves a meticulous analysis and refinement of both spatial elements (such as pixel quality, color consistency, and object continuity across frames) and temporal aspects (including motion smoothness, frame-rate stability, and temporal coherence). By using advanced algorithms to assess and enhance the inter-frame relationships and intra-frame integrity in block 520, the computing device or system ensures that the resultant video clips exhibit a high degree of visual fidelity and temporal consistency. Optimizing spatio-temporal dependence structures between the frames may minimize discontinuities and inconsistencies in the visual information presented to viewers. This optimization in block 520 not only elevates the viewer's perceptual experience by providing a seamless and natural flow of content but also ensures that the advertisement messages are delivered in a clear, engaging, and visually appealing manner within a consistent storyline.

Figure 6:
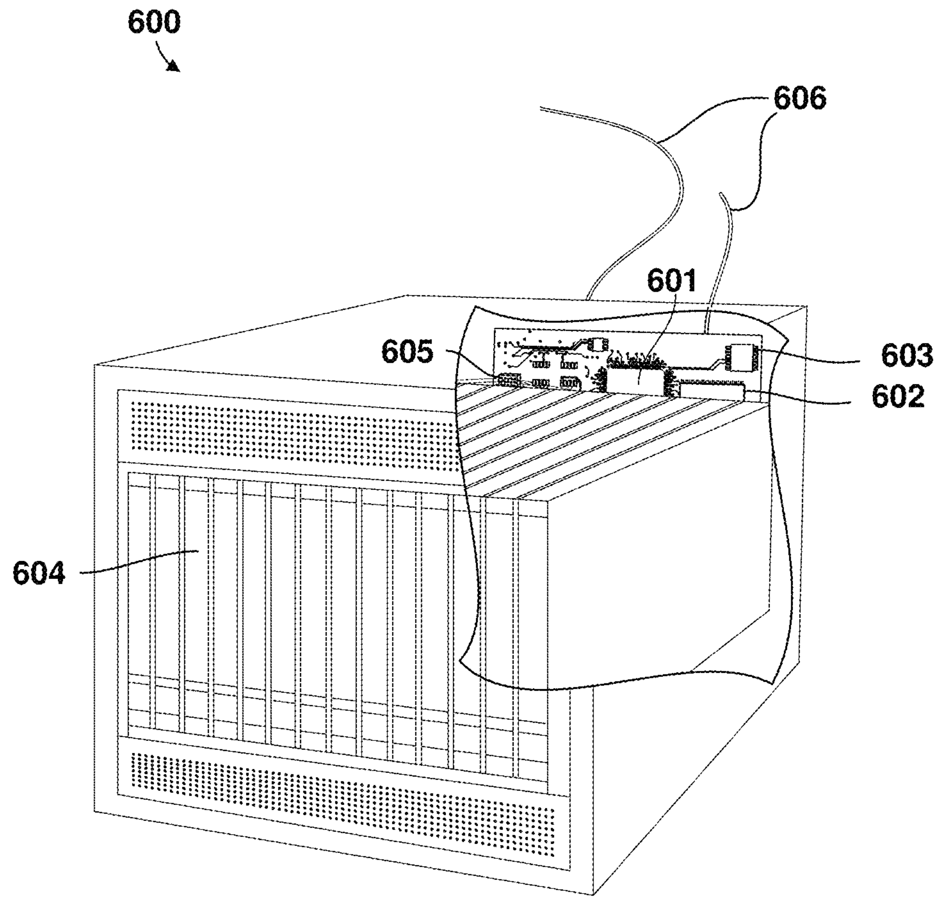
FIG. 6 is a component block diagram illustrating an example server computing system suitable for implementing various embodiments.

Various embodiments (including, but not limited to, embodiments described above with reference to FIGS. 1-5B) may be implemented in fixed computing systems, such as any of a variety of generalized or specialize computing systems, an example of which in the form of a server computing system 600 is illustrated in FIG. 6. A server computing system 600 typically includes one or more multicore processor systems 601 coupled to volatile memory 602 and a large capacity nonvolatile memory, such as a nonvolatile disk drive 604. The processing systems 601 may include or be coupled to specialized processors 603 configured to perform calculations involved in neural network processing and machine learning such as graphical processing units (GPU), neural network processors and the like. In some implementations, multiple processing system and memory units 604 may be implemented within the computing system 600, such as to permit parallel processing and segmented processing of input data (e.g., image datasets) according to various embodiments. The server computing system 600 may also include network access ports 605 coupled to the multicore processor assemblies 601 for establishing network interface connections with a network 606, such as a local area network, the Internet, and other networks, such as for receiving image datasets and exporting completed OCR model training datasets.

Implementation examples are described in the following paragraphs. While some of the following implementation examples are described in terms of example methods, further example implementations may include the example methods discussed in the following paragraphs implemented by a computing device such as a server within a CDN including a processor configured with processor-executable instructions to perform operations of the methods of the following implementation examples; example methods discussed in the following paragraphs implemented by a server within a CDN including means for performing functions of the methods of the following implementation examples; and example methods discussed in the following paragraphs may be implemented as a non-transitory processor-readable storage medium having stored thereon processor-executable instructions configured to cause a server of a CDN to perform the operations of the methods of the following implementation examples.

Example 1. A method for generating an advertisement video for insertion as an ad into a primary video stream in which the advertisement video promotes a particular product, service, or brand in a manner that is consistent with the context and storyline of the primary video stream before and at the time of ad insertion, including: capturing a selected image or images from the primary video stream before an ad splice break; processing the captured images in an image-to-text description module to generate a caption text that describes a context and storyline of the captured selected images of the primary video stream; selecting, from among a plurality of products, services, or brands to be advertised, one product, service, or brand that resembles or is consistent with the context and storyline of the captured images; refining the generated caption text of the context and storyline to include the selected product, service, or brand to generate ad video sequence description text that describes an ad storyline involving the selected product, service, or brand that couples or blends the selected product, service, or brand with context and storyline of the captured images of the primary video stream; applying the ad video sequence description text to a text-to-video generation model to generate a new advertisement video clip; and inserting the generated new advertisement video clip into the primary video stream for distribution to video content rendering devices.

Example 2. The method of example 1, in which inserting the generated new advertisement video clip into the primary video stream for distribution to video content rendering devices includes inserting the generated new advertisement video clip into the primary video stream in the ad splice break just after capture of the selected image or images from the primary video stream.

Example 3. The method of either of examples 1 or 2, in which the text-to-video generation model is a diffusion probabilistic model that will solve the likelihood of objects selection based on the tokens in the text.

Example 4. The method of any of examples 1-3, further including optimizing the spatio-temporal dependent structures of the generated new advertisement video clip frames to reduce noise of the video creation process.

Example 5. The method of any of examples 1-4, in which capturing selected images from the primary video stream includes: monitoring the primary video stream to recognize scenes durations; and extracting an image within a scene that lasts longer than a threshold duration.

Example 6. The method of example 5, in which monitoring the primary video stream to recognize scenes that last longer than a threshold duration begins in response to an SCTE35/SCTE104 marker event in the primary video stream that an advertisement insertion opportunity is upcoming.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for generating an advertisement video for insertion as an ad into a primary video stream in which the advertisement video promotes a particular product, service, or brand in a manner that is consistent with the context and storyline of the primary video stream before and at the time of ad insertion, comprising:

capturing a selected image or images from the primary video stream before an ad splice break;

processing the captured images in an image-to-text description module to generate a caption text that describes a context and storyline of the captured selected images of the primary video stream;

selecting, from among a plurality of products, services, or brands to be advertised, one product, service, or brand that resembles or is consistent with the context and storyline of the captured images;

refining the generated caption text of the context and storyline by using the caption text and descriptions of the selected product, service, or brand to be advertised to prompt a trained language model to rewrite the caption text to integrate descriptions of the selected product, service, or brand into the context and storyline of the captured images to generate ad video sequence description text that describes an ad storyline involving the selected product, service, or brand that couples or blends the selected product, service, or brand with context and storyline of the captured images of the primary video stream;

applying the ad video sequence description text by including the ad video sequence description text in a prompt input to a text-to-video generation model trained to generate a series of photorealistic video frames based on the description in the ad video sequence description text, with each image varying to render movement of objects in a scene to create a video clip as described in the ad video sequence description text, to generate and store, just before the ad splice break occurs, a new advertisement video clip that is not pre-recorded; and inserting the generated new advertisement video clip into the primary video stream at the ad splice break, by manipulating a streaming manifest to substitute the generated advertisement video clip for an advertisement segment for distribution to video content rendering devices.

2. The method of claim 1, wherein inserting the generated new advertisement video clip into the primary video stream for distribution to video content rendering devices comprises inserting the generated new advertisement video clip into the primary video stream in the ad splice break just after capture of the selected image or images from the primary video stream.

3. The method of claim 1, wherein the text-to-video generation model is a diffusion probabilistic model that will solve the likelihood of object selection based on the tokens in the text.

4. The method of claim 1, further comprising, before inserting the generated new advertisement video clip into the primary video stream, enhancing the spatio-temporal dependent structures of the generated new advertisement video clip frames to reduce noise of the video creation process by adjusting alignment and coherence between adjacent frames of the generated new advertisement video clip based on spatial and temporal relationships, the adjustment including refining spatial elements including pixel quality, color consistency, and object continuity across frames and temporal aspects including motion smoothness, frame-rate stability, and temporal coherence.

5. The method of claim 1, wherein capturing selected images from the primary video stream comprises:

monitoring the primary video stream to recognize scene durations; and extracting an image within a scene that lasts longer than a threshold duration.

6. The method of claim 5, wherein monitoring the primary video stream to recognize scenes that last longer than a threshold duration begins in response to an SCTE35/SCTE104 marker event in the primary video stream that an advertisement insertion opportunity is upcoming.

7. A server, comprising:

a network interface configured for receiving a primary video stream;

a memory; and a processing system coupled to the network interface and the memory, the processing system including one or more processors configured to:

capture a selected image or images from the primary video stream before an ad splice break;

process the captured images in an image-to-text description module to generate a caption text that describes a context and storyline of the captured selected images of the primary video stream;

select, from among a plurality of products, services, or brands to be advertised, one product, service, or brand that resembles or is consistent with the context and storyline of the captured images;

refine the generated caption text of the context and storyline by using the caption text and descriptions of the selected product, service, or brand to be advertised to prompt a trained language model to rewrite the caption text to integrate descriptions of the selected product, service, or brand into the context and storyline of the captured images to generate ad video sequence description text that describes an ad storyline involving the selected product, service, or brand that couples or blends the selected product, service, or brand with context and storyline of the captured images of the primary video stream;

apply the ad video sequence description text by including the ad video sequence description text in a prompt input to a text-to-video generation model trained to generate a series of photorealistic video frames based on the description in the ad video sequence description text, with each image varying to render movement of objects in a scene to create a video clip as described in the ad video sequence description text, to generate and store, just before the ad splice break occurs, a new advertisement video clip that is not pre-recorded; and insert the generated new advertisement video clip into the primary video stream by manipulating a streaming manifest to substitute the generated advertisement video clip for an advertisement segment for distribution to video content rendering devices.

8. The server of claim 7, wherein the one or more processors are configured to insert the generated new advertisement video clip into the primary video stream for distribution to video content rendering devices by inserting the generated new advertisement video clip into the primary video stream in the ad splice break just after capture of the selected image or images from the primary video stream.

9. The server of claim 7, wherein the text-to-video generation model is a diffusion probabilistic model that will solve the likelihood of object selection based on the tokens in the text.

10. The server of claim 7, wherein the one or more processors are further configured to enhance the spatio-temporal dependent structures of the generated new advertisement video clip frames to reduce noise of the video creation process.

11. The server of claim 7, wherein the one or more processors are configured to capture selected images from the primary video stream by:

monitoring the primary video stream to recognize scene durations; and extracting an image within a scene that lasts longer than a threshold duration.

12. The server of claim 11, wherein the one or more processors are further configured to begin monitoring the primary video stream to recognize scenes that last longer than a threshold duration in response to an SCTE35/SCTE104 marker event in the primary video stream indicating that an advertisement insertion opportunity is upcoming.

13. The server of claim 7, wherein the server is configured for use in a content distribution network.

14. A non-transitory processor-readable medium having stored thereon processor-executable instructions configured to cause one or more processors of a processing system in a content distribution network to perform operations comprising:

capturing a selected image or images from a primary video stream before an ad splice break;

processing the captured images in an image-to-text description module to generate a caption text that describes a context and storyline of the captured selected images of the primary video stream;

selecting, from among a plurality of products, services, or brands to be advertised, one product, service, or brand that resembles or is consistent with the context and storyline of the captured images;

refining the generated caption text of the context and storyline by using the caption text and descriptions of the selected product, service, or brand to be advertised to prompt a trained language model to rewrite the caption text to integrate descriptions of the selected product, service, or brand into the context and storyline of the captured images to generate ad video sequence description text that describes an ad storyline involving the selected product, service, or brand that couples or blends the selected product, service, or brand with context and storyline of the captured images of the primary video stream;

applying the ad video sequence description text by including the ad video sequence description text in a prompt input to a text-to-video generation model trained to generate a series of photorealistic video frames based on the description in the ad video sequence description text, with each image varying to render movement of objects in a scene to create a video clip as described in the ad video sequence description text, to generate and store, just before the ad splice break occurs, a new advertisement video clip that is not pre-recorded; and inserting the generated new advertisement video clip into the primary video stream by manipulating a streaming manifest to substitute the generated advertisement video clip for an advertisement segment for distribution to video content rendering devices.

15. The non-transitory processor-readable medium of claim 14, wherein the stored processor-executable instructions are further configured to cause the one or more processors to perform operations such that inserting the generated new advertisement video clip into the primary video stream for distribution to video content rendering devices comprises inserting the generated new advertisement video clip into the primary video stream in the ad splice break just after capture of the selected image or images from the primary video stream.

16. The non-transitory processor-readable medium of claim 14, wherein the stored processor-executable instructions are further configured such that the text-to-video generation model is a diffusion probabilistic model that will solve the likelihood of object selection based on the tokens in the text.

17. The non-transitory processor-readable medium of claim 14, wherein the stored processor-executable instructions are further configured to cause the one or more processors to perform operations further comprising enhancing the spatio-temporal dependent structures of the generated new advertisement video clip frames to reduce noise of the video creation process.

18. The non-transitory processor-readable medium of claim 14, wherein the stored processor-executable instructions are further configured to cause the one or more processors to perform operations such that capturing selected images from the primary video stream comprises:

monitoring the primary video stream to recognize scene durations; and extracting an image within a scene that lasts longer than a threshold duration.

19. The non-transitory processor-readable medium of claim 14, wherein the stored processor-executable instructions are further configured to cause the one or more processors to perform operations such that monitoring the primary video stream to recognize scenes that last longer than a threshold duration begins in response to an SCTE35/SCTE104 marker event in the primary video stream that an advertisement insertion opportunity is upcoming.

* * * * *